(12) United States Patent
Lindoff et al.

(10) Patent No.: US 9,385,833 B2
(45) Date of Patent: Jul. 5, 2016

(54) DEVICE AND METHOD FOR CONTROLLING INTERFERENCE

(75) Inventors: Bengt Lindoff, Bjärred (SE); Konstantinos Dimou, Stockholm (SE); Matthias Kamuf, München (DE)

(73) Assignee: Optis Cellular Technology, LLC, Plano, TX (US)

( * ) Notice: Subject to any disclaimer, the term of this patent is extended or adjusted under 35 U.S.C. 154(b) by 197 days.

(21) Appl. No.: 14/125,384

(22) PCT Filed: May 31, 2012

(86) PCT No.: PCT/EP2012/060245
§ 371 (c)(1),
(2), (4) Date: Feb. 10, 2014

(87) PCT Pub. No.: WO2012/171805
PCT Pub. Date: Dec. 20, 2012

(65) Prior Publication Data
US 2014/0153490 A1    Jun. 5, 2014

Related U.S. Application Data

(60) Provisional application No. 61/496,753, filed on Jun. 14, 2011.

(30) Foreign Application Priority Data

Jun. 14, 2011 (EP) .................................. 11169785

(51) Int. Cl.
*H04L 1/00* (2006.01)
*H04J 11/00* (2006.01)

(52) U.S. Cl.
CPC ........... *H04L 1/0009* (2013.01); *H04J 11/0023* (2013.01); *H04L 1/0036* (2013.01)

(58) Field of Classification Search
CPC ... H04J 11/0023; H04L 1/0009; H04L 1/0036
USPC ........................................................ 370/328
See application file for complete search history.

(56) References Cited

U.S. PATENT DOCUMENTS 6,442,209 B1 * 8/2002 Marque-Pucheu .. H04B 7/2643
 375/259
6,473,415 B1 10/2002 Kim et al.
(Continued)

FOREIGN PATENT DOCUMENTS

EP 1699193 A1 9/2006
EP 1926217 A2 5/2008
(Continued)

*Primary Examiner* — Huy D Vu
*Assistant Examiner* — Stephen J Clawson
(74) *Attorney, Agent, or Firm* — Thomas L. Crisman; Lewis W. Schiel (57) ABSTRACT

Embodiments herein relate to a method in a transceiver (400) for enabling control of interference cancelling in the transceiver (400). The transceiver (400) is in a first decoding mode. The transceiver (400) stores a received signal comprising a data block. The transceiver (400) decodes the received signal using the first decoding mode, thereby obtaining the data block. When an event is triggered, the transceiver (400) retrieves the stored signal. The transceiver (400) decodes the retrieved signal using a second decoding mode, thereby obtaining the data block. The transceiver (400) controls the interference cancelling in the transceiver (400), based on the data block decoded using the first decoding mode and the data block decoded using the second decoding mode.

12 Claims, 5 Drawing Sheets

(56) References Cited

U.S. PATENT DOCUMENTS

| | | | |
|---|---|---|---|
| 7,254,197 B2 | 8/2007 | Heo et al. | |
| 8,279,985 B2* | 10/2012 | Liu | H04L 1/0036 375/260 |
| 2003/0048838 A1 | 3/2003 | Sexton et al. | |
| 2003/0092461 A1* | 5/2003 | Moulsley | H04L 1/0026 455/522 |
| 2006/0133533 A1* | 6/2006 | Khandekar | H04L 1/0025 375/279 |
| 2007/0153942 A1 | 7/2007 | Zeng et al. | |
| 2008/0165874 A1* | 7/2008 | Steele | H04L 1/0026 375/261 |
| 2009/0060086 A1* | 3/2009 | Kimmich | H04N 19/66 375/295 |
| 2010/0054310 A1 | 3/2010 | Yule et al. | |
| 2010/0223522 A1 | 9/2010 | Duggan | |
| 2010/0227624 A1 | 9/2010 | De Pasquale et al. | |
| 2011/0064066 A1 | 3/2011 | Lamba et al. | |

FOREIGN PATENT DOCUMENTS

| | | |
|---|---|---|
| WO | 2004017655 A1 | 2/2004 |
| WO | 2011000626 A1 | 1/2011 |

* cited by examiner

DEVICE AND METHOD FOR CONTROLLING INTERFERENCE

TECHNICAL FIELD

Embodiments herein relate generally to a transceiver and a method in the transceiver. More particularly the embodiments herein relate to enabling control of interference cancelling in the transceiver.

BACKGROUND

In a typical cellular network, also referred to as a communication network, User Equipments (UEs), communicate via a Radio Access Network (RAN) to one or more Core Networks (CN).

A user equipment is a mobile terminal by which a subscriber may access services offered by an operator's core network and services outside the operator's network to which the operator's RAN and CN provide access. The user equipments may be for example communication devices such as mobile telephones, cellular telephones, or laptops with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between the user equipment and a regular telephone and/or between the user equipment and a server via the radio access network and possibly one or more core networks, comprised within the network.

The cellular network covers a geographical area which is divided into cell areas. Each cell area is served by a base station, e.g. a Radio Base Station (RBS), which sometimes may be referred to as e.g. evolved Node B (eNB), "eNodeB", "NodeB", "B node", or Base Transceiver Station (BTS), depending on the technology and terminology used. The base stations communicate over the air interface operating on radio frequencies with the user equipments within range of the base stations.

In telecommunications, the term interference may be defined as anything which alters, modifies, or disrupts a signal as it travels along a channel between a source and a receiver, e.g. between a base station and a user equipment. The term typically refers to the addition of unwanted signals to a useful signal. For example, interference may cause voice quality to drop, call drop, link and network performance degradation etc. However, it is possible to cancel the interference. Interference cancelling comprises removal of an undesired component from a signal, which signal comprises both a desired signal and an undesired signal.

In a near future, Interference Cancelling (IC) capable user equipments are a reality. Using IC other data streams/users and/or arbitrary signals may be estimated and subtracted from the desired data stream and thereby significantly improve the link performance for user equipments that experience significant inter/intra-cell interference. Apart from the common homogeneous network layouts, such advanced receiver features of the user equipments will become especially important in heterogeneous network deployments that are currently standardized.

Interference cancelling typically comprises multiple coding and decoding steps, which significantly increase the total processing cost and hence increases a user equipments power consumption. While there are scenarios where these techniques are necessary to maintain good link performance, there are also scenarios where this kind of processing is not needed, for example when there is actually no intra/inter-cell interference at all and in this case, IC might even degrade the performance, or even when the UE is within an area or cell where previous measurements and other previous knowledge of the network has shown that interference in this area originates only from 1 or 2 neighbor cells. In such a case, other techniques such as fractional frequency reuse, fractional power control may reduce other cell interference only by actions taken by the network. Thereby always using IC in a battery driven user equipment is an unnecessary use of the processing resources and battery power.

SUMMARY

The objective of embodiments herein is therefore to obviate at least one of the above disadvantages and to provide improved control of interference in a communications network.

According to a first aspect, the objective is achieved by a method in a transceiver for enabling control of interference cancelling in the transceiver. The transceiver is in a first decoding mode. The transceiver stores a received signal comprising a data block. The transceiver decodes the received signal using the first decoding mode, thereby obtaining the data block. When an event is triggered, the transceiver retrieves the stored signal. The transceiver decodes the retrieved signal using a second decoding mode, thereby obtaining the data block. The transceiver controls the interference cancelling in the transceiver, based on the data block decoded using the first decoding mode and the data block decoded using the second decoding mode.

According to a second aspect, the objective is achieved by a transceiver configured to enable control of interference cancelling in the transceiver. The transceiver is in a first decoding mode. The transceiver comprises a storing unit configured to store a received signal comprising a data block. The transceiver comprises a decoding unit configured to decode the received signal using the first decoding mode, thereby obtaining the data block. Further, the transceiver comprises a retrieving unit configured to, when an event is triggered, retrieve the stored signal. The decoding unit is further configured to decode the retrieved signal using a second decoding mode, thereby obtaining the data block. The transceiver further comprises a controlling unit configured to control the interference cancelling in the transceiver, based on the data block decoded using the first decoding mode and the data block decoded using the second decoding mode.

The embodiments herein store and decode received data blocks with one of an IC decoding or a non-IC decoding approach. Once a certain event occurs, e.g. block error, time instant, transport block size, Modulation and Coding Scheme (MCS), Signal to Noise and interference Ratio (SINR) per Resource Block (RB), serving cell change, etc., the data block is retrieved from a memory and decoded using the other decoding method. The result is evaluated and, based on the evaluation, the decoding mode is switched. In other words, the transceiver detects when IC should be enabled or disabled. Thus, improved control of interference in a communications network is provided.

Embodiments herein afford many advantages, of which a non-exhaustive list of examples follows:

An advantage of the embodiments herein is that it is possible to dynamically and autonomously determine the best receiver technique on-the-fly, i.e. to enable and disable IC functionality.

By enabling interference cancelling only when it is necessary, another advantage of the embodiments herein is that they reduce the total processing cost and hence a user equipments power consumption. Further, the link performance of the communications network is also improved.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
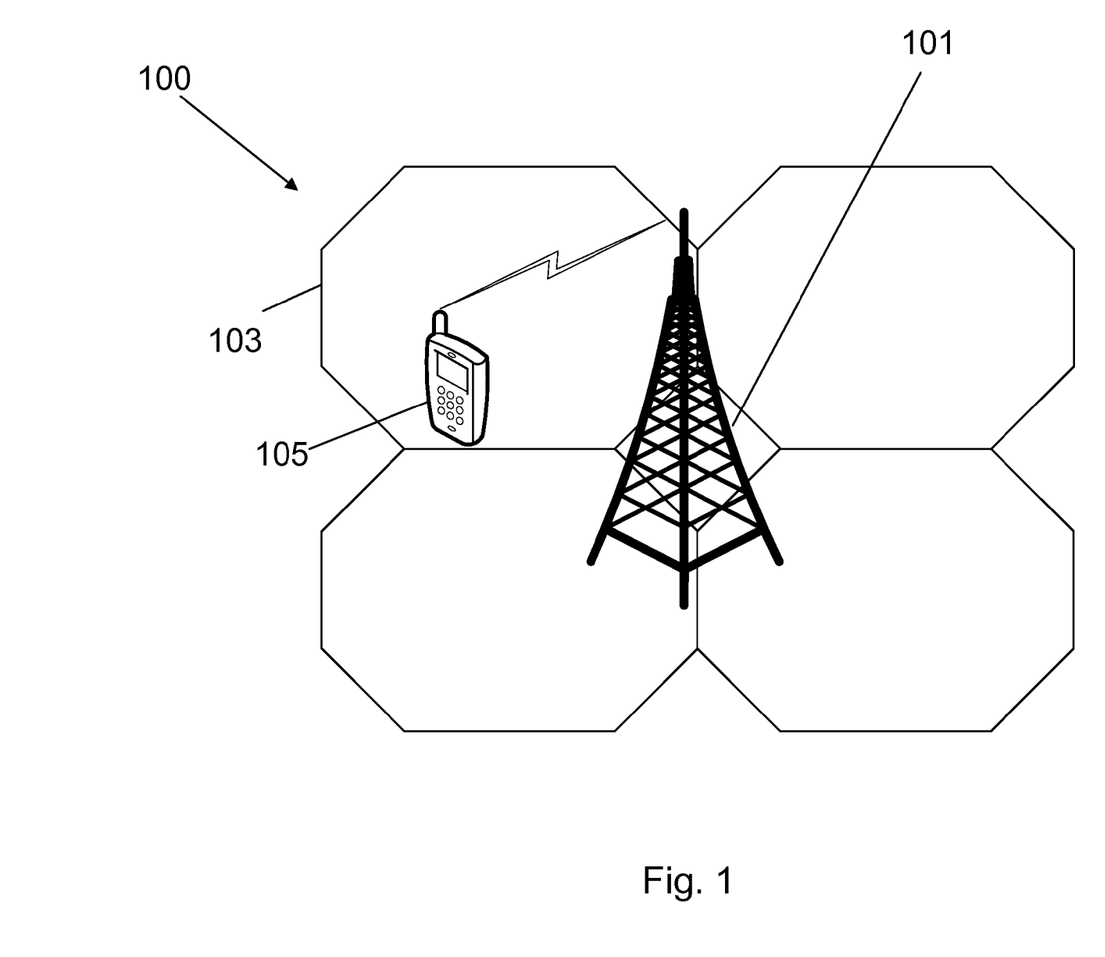
FIG. 1 is a schematic block diagram illustrating embodiments of a communications network.

FIG. 1 depicts a communications network 100 in which embodiments herein may be implemented. The communications network 100 may in some embodiments apply to one or more radio access technologies such as for example Long Term Evolution (LTE), LTE Advanced, Wideband Code Division Multiple Access (WCDMA), Global System for Mobile Communications (GSM), Evolution-Data Optimized (EV-DO)/CDMA or any other Third Generation Partnership Project (3GPP) radio access technology.

The communications network 100 comprises a base station 101 serving a cell 103. The base station 110 may be a base station such as a NodeB, an evolved NodeB (eNB), BTS or any other network unit capable to communicate over a radio carrier with a user equipment 105 being present in the cell 103.

The user equipment 105 may be any suitable communication device or computational device with communication capabilities capable to communicate with the base station 101 over a radio channel, for instance but not limited to mobile phone, smart phone, personal digital assistant (PDA), laptop, MP3 player or portable Digital Versatile Disk (DVD) player, or similar media content devices, digital camera, or even stationary devices such as a Personal Computer (PC). A PC may also be connected via a mobile station as the end station of the broadcasted/multicasted media. The user equipment 105 may also be an embedded communication device in e.g. electronic photo frames, cardiac surveillance equipment, intrusion or other surveillance equipment, weather data monitoring systems, vehicle, car or transport communication equipment, etc. The user equipment 105 is referred to as UE in some of the figures.

Figure 4:
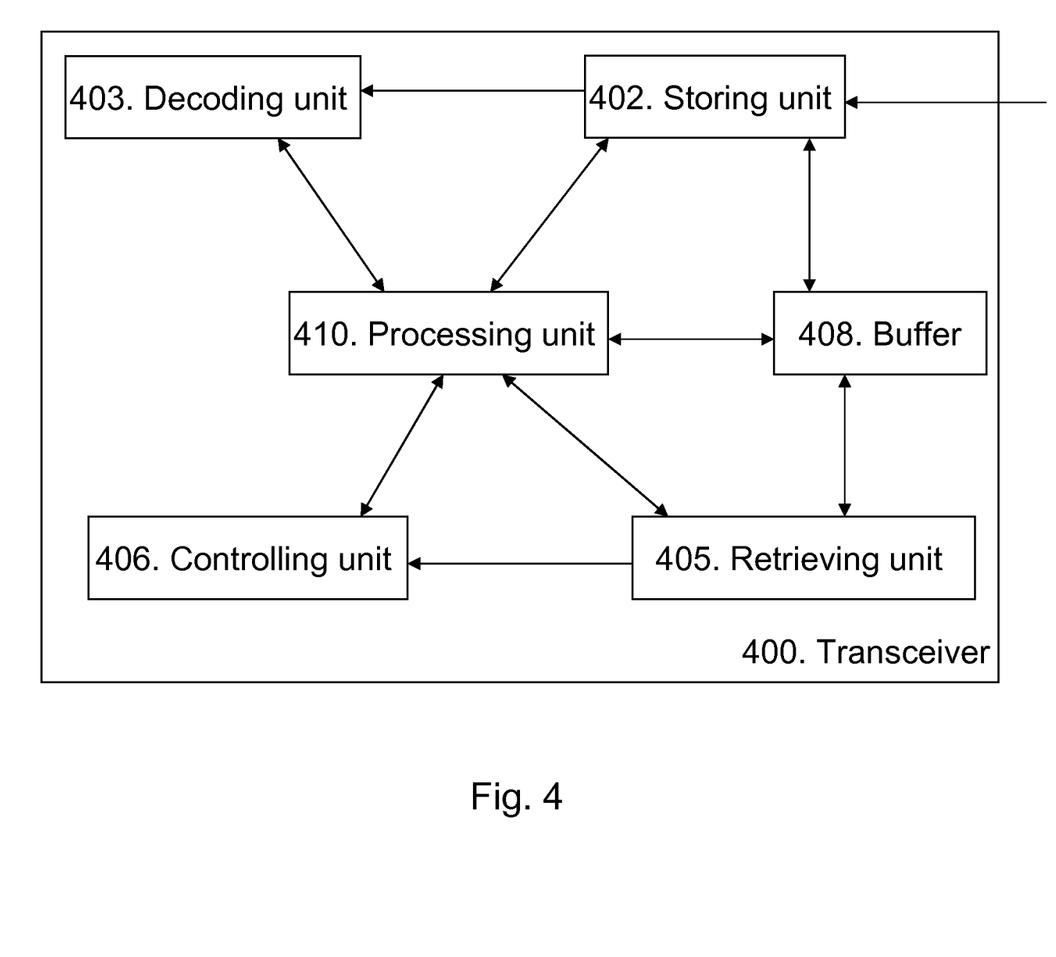
FIG. 4 is a block diagram illustrating embodiments of a transceiver.

The user equipment 105 and/or the base station 101 comprise a transceiver 400 (not shown in FIG. 1, the reference number 400 refers to FIG. 4). A transceiver 400 is a device that has both a transmitter and a receiver. The transceiver 400 is configured to operate in either a non-interference cancelling (first) mode or an interference cancelling (second) mode. The transceiver 400 will be described in more detail below in relation to FIG. 4.

Figure 2:
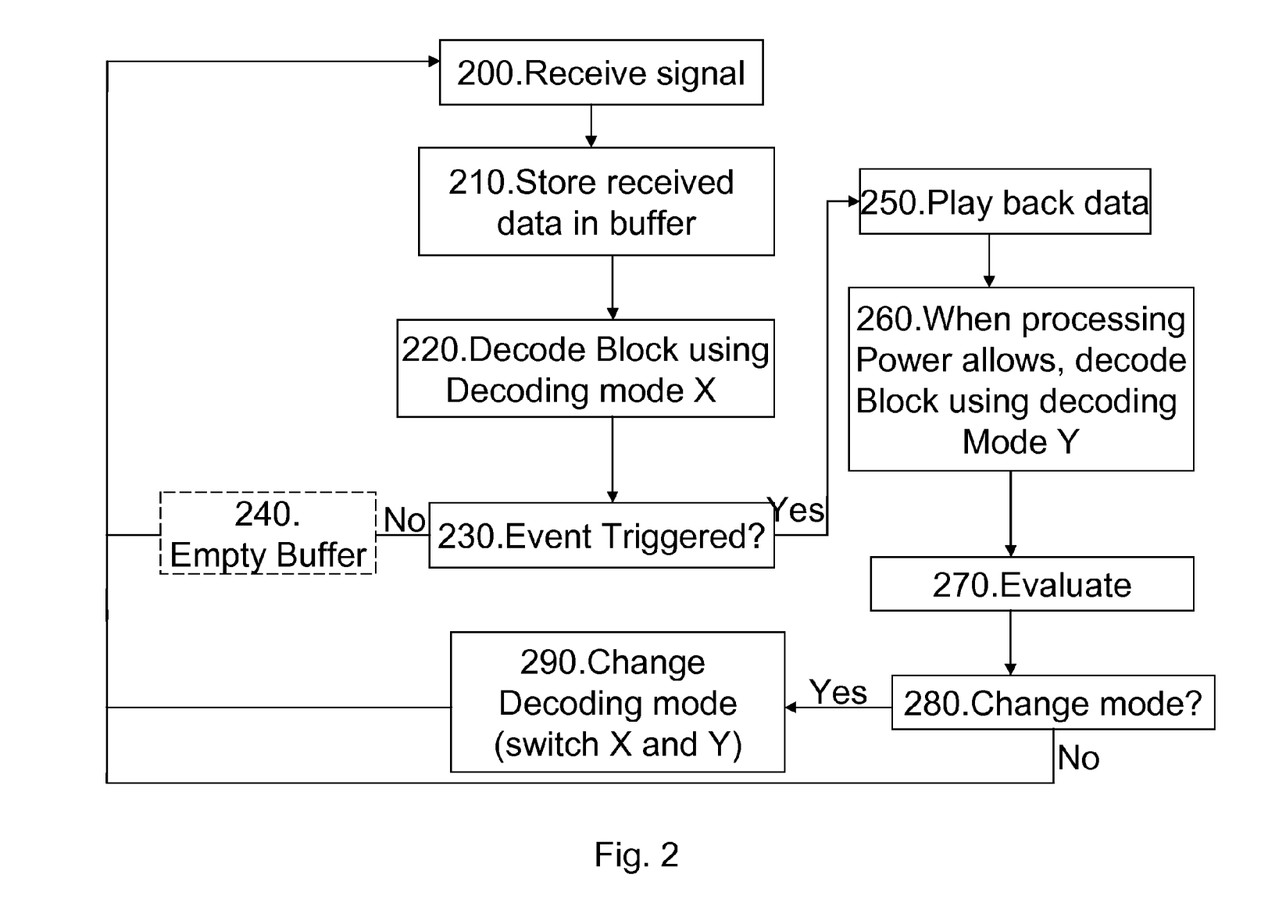
FIG. 2 is a flow chart illustrating embodiments of a method.

FIG. 2 is a flow chart illustrating embodiments of a method in the transceiver 400. The transceiver 400 is IC capable, i.e. the transceiver is in the interference cancelling mode. Further the transceiver 400 is in connected mode with the network 100. The connected mode may also be referred to as active mode, and is a mode when interference cancelling may enhance the performance of the transceiver 400. The transceiver 400 may also be in idle mode where the user equipment 103 is still connected to the base station 101 but only receiving paging signals for information about page. The transceiver 400 may be comprised in the user equipment 103 or in the base station 101. In the description below it is assumed that the transceiver 400 starts by being in a first decoding mode. For example, the first decoding mode is a non-IC decoding mode.

Step 200

The transceiver 400 receives a signal from a network node 101. The network node 101 may be e.g. a base station 101. The transceiver 400 may receive the signal on a regular or irregular basis. The signal comprises a data block, typically a sub frame, or a number of RBs allocated to the user equipment 103. A resource block is a subset of sub-carriers in the time-frequency domain.

In some embodiments, the transceiver 400 is comprised in a user equipment 103 and the network node is a base station 101, or the transceiver 400 may be comprised in a base station 101 and the network node is a user equipment 103.

Step 210

The transceiver 400 stores the received signal in a buffer. The buffer may be located in a memory unit in the transceiver 400 or in an external memory unit.

In some embodiments, the transceiver 400 performs some processing of the signal before it is stored. The processing may be for example filtering, down sampling of the received signal etc. It is a processing made on the received signal prior to become a symbol sampled baseband signal.

Step 220

The transceiver 400 decodes the received signal using the first decoding mode to obtain the data block. As mentioned above, the first decoding mode may be a non-IC decoding mode and the data block is typically a sub frame, or a number of RBs in a sub frame allocated to the user equipment 103.

Step 230

The transceiver 400 monitors and determines whether an event is triggered or not. The event may be for instance a block error rate. i.e. in case of using a non-IC decoding mode, a time instant or counter related to a number of correct decoded blocks in a row, for instance in case using the IC decoding mode, a code rate, transport block, different SINR per RB, the change of a serving cell, the location within a given cell, etc.

Step 240

If no event was triggered in step 230, illustrated as "no" in FIG. 2, the transceiver 400 may, in some embodiments, determine to discard or empty the buffer. The buffer may be partially or totally emptied.

After the buffer is emptied, the method returns to step 200, thereby waiting to receive another signal.

Step 250

In case the event is triggered in step 230, illustrated as "yes" in FIG. 2, the transceiver 400 retrieves the data from the buffer.

Step 260

The transceiver 400 decodes the retrieved data using the second decoding mode to obtain the data block. The second decoding mode may be the IC mode. It is the same data block that is decoded in step 220, however they are obtained by using different decoding modes.

In some embodiments, the processing power of the transceiver 400 is limited and simultaneous processing of both decoding modes is therefore not possible. Hence the decoding using the second decoding mode is made once processing power is available in the transceiver 400, i.e. on a "best effort basis". As a consequence of that, one Transmission Time Interval (TTI) may be processed over several TTIs prior to be finished. In some embodiments, the processing using the second decoding mode is made in a processing unit external to the transceiver 400.

Step 270

Once the data block is decoded using the second decoding mode, the data block is evaluated.

When evaluating, the data block data block decoded using the first decoding mode and the data block decoded using the second decoding mode are evaluated to see which decoding mode gives the best result. To do this, different parameters associated with the decoded data blocks are evaluated. For example, a cyclic redundancy check (CRC) for the data block decoded using the first decoding mode and the CRC for the data block decoded using the second decoding mode may be evaluated. The CRC is a check sum that gives information on whether the data is correctly decoded or not, which can be detected by that the decoded data block comprises block errors.

Other parameters that may be used in the evaluation are for example soft values, estimated SNRs, Block Error Rate (BLER) etc.

Step 280

Based on the evaluated decoded signal, i.e. which decoding mode gives the best result, the transceiver 400 determines that it should remain in the first decoding mode or that it should change to the second decoding mode, enabling control of interference cancelling in the transceiver 400.

Based on the outcome of the evaluation of the parameters such as e.g. CRC, soft values, estimated SNR, BLER, as described above, the transceiver 400 determines whether it should remain in the first decoding mode or whether it should change to the second decoding mode.

For instance, assuming BLER is an event, a typical working point may be at 10-30% BLER. Hence, only one block error using the non-IC decoding mode should not trig a change to the IC decoding mode, since on average every 5-10 blocks should be erroneously decoded. However, in case the BLER during a certain number of frames is much higher than the 30% and at the same time, the IC decoding mode has successfully decoded the data block, a change should be made. Opposite, in case there has been no BLER for a long time using the IC decoding mode and sufficient performance, e.g. 10-30% BLER, using the non-IC decoding mode, a decoding switch to the other decoding mode should be made.

Step 290

If step 280 determined a change of decoding mode, the decoder is changed, e.g. to IC decoding mode.

If step 280 did not determine a decoder change, the method goes back to step 200.

Figure 3A:
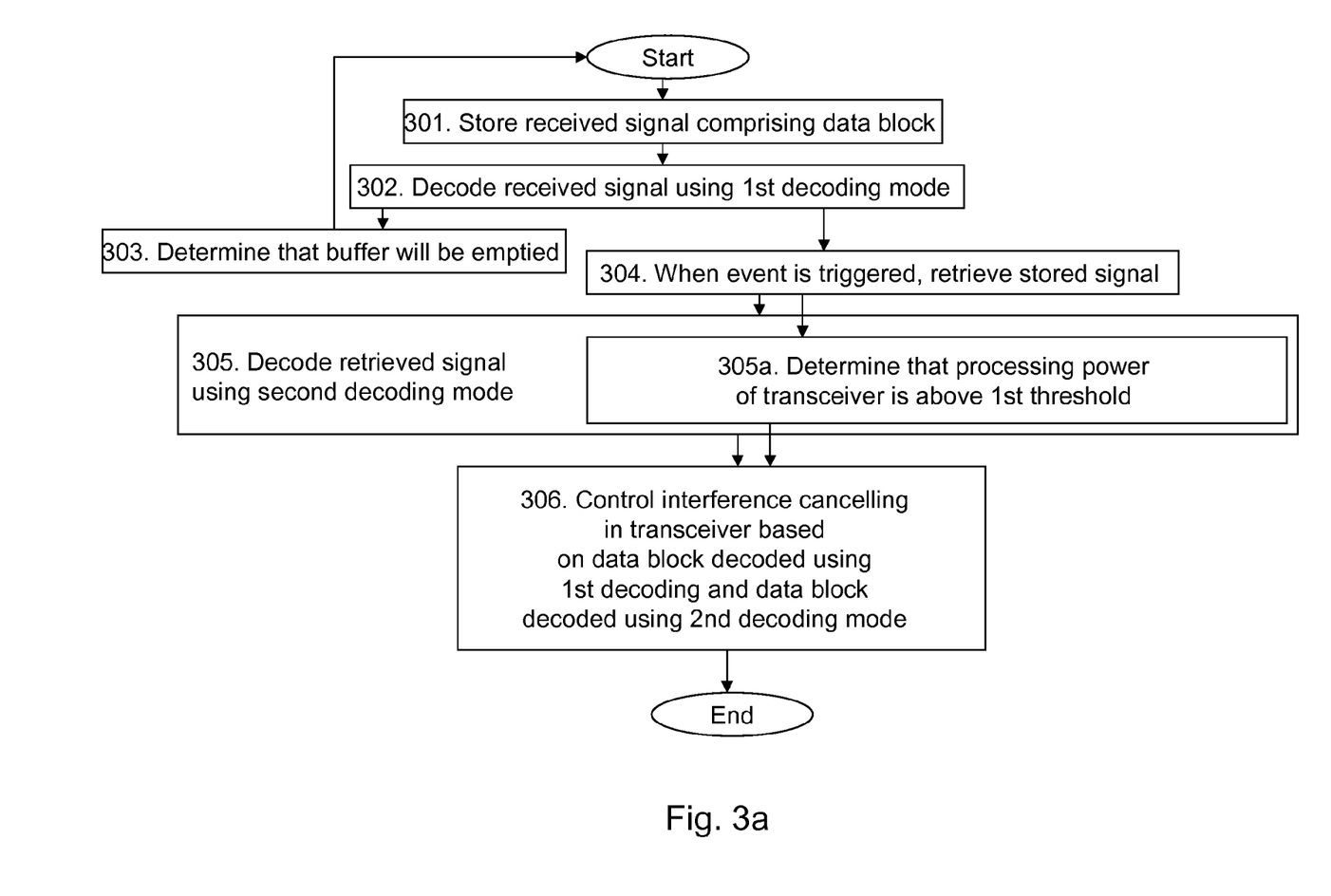
FIGS. 3a and 3b are flow charts illustrating embodiments of a method in a transceiver.
Figure 3B:
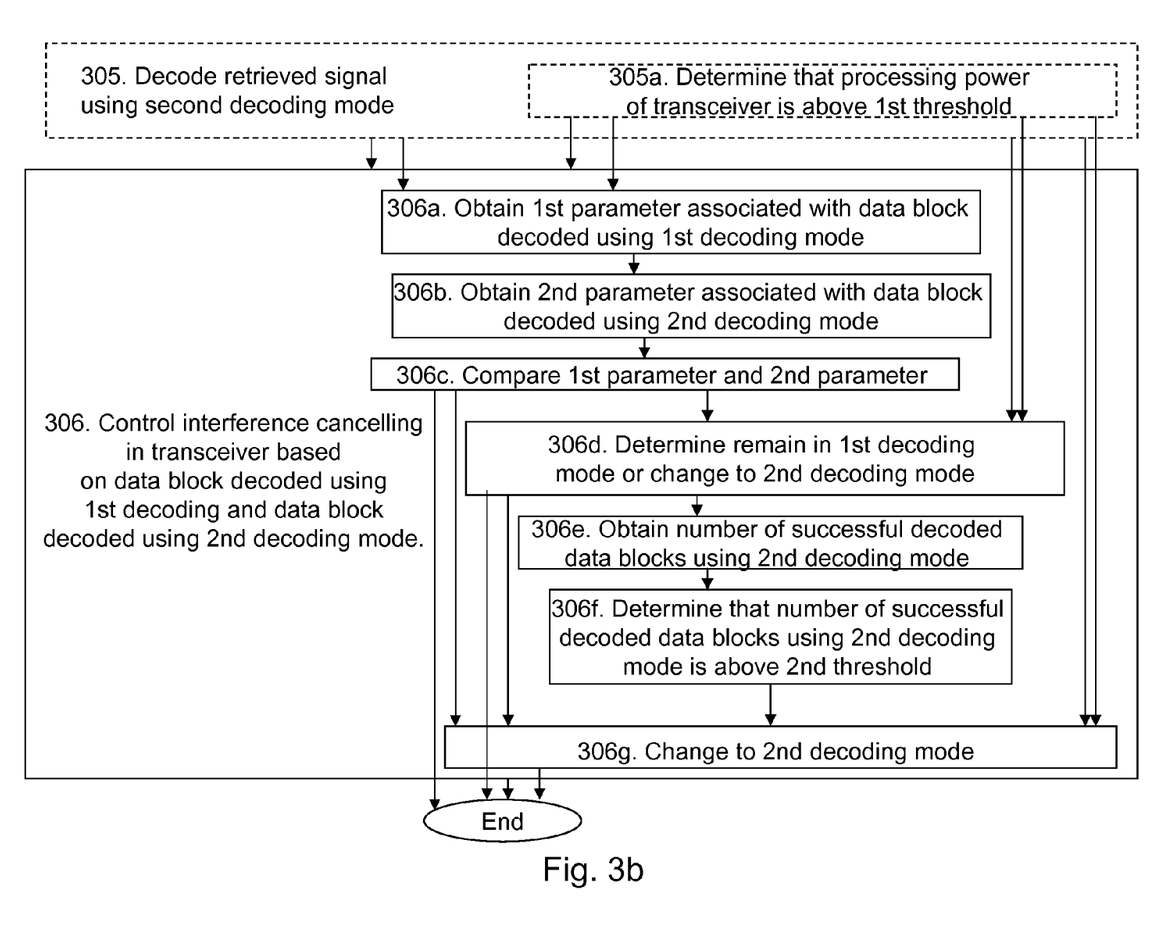

The method described above will now be described seen from the perspective of the transceiver 400. FIGS. 3*a* and FIG. 3*b* are flowcharts describing the present method in the transceiver 400 for enabling control of interference cancelling in the transceiver 400. In some embodiments, the transceiver 400 is comprised in a user equipment 103 or in a base station 101. The transceiver 400 is in a first decoding mode. In some embodiments, the first decoding mode is a non-interference cancelling mode and the second mode is an interference cancelling mode. In some embodiments, the first decoding mode is an interference cancelling mode and the second mode is a non-interference cancelling mode. The method comprises the steps to be performed by the transceiver 400:

Step 301

This step corresponds to steps 200 and 210 in FIG. 2.

The transceiver 400 stores a received signal comprising a data block.

In some embodiments, the transceiver stores the received signal in a buffer

Step 302

This step corresponds to step 220 in FIG. 2.

The transceiver 400 decodes the received signal using the first decoding mode, thereby obtaining the data block.

Step 303

This step corresponds to step 240 in FIG. 2.

In some embodiments, the transceiver 400 determines that the buffer will be emptied.

Step 304

This step corresponds to steps 230 and 250 in FIG. 2.

When an event is triggered, the transceiver 400 retrieves the stored signal.

In some embodiments, the event is associated with a block error rate, a number of corrected decoded signals, code rate, transport block size, signal to interference and noise ratio, change of a serving cell or a location of the transceiver 400 in a cell 103.

Step 305

This step corresponds to step 260 in FIG. 2.

The transceiver 400 decodes the retrieved signal using a second decoding mode, thereby obtaining the data block.

Step 305*a*

This step corresponds to step 260 in FIG. 2. This is a sub step of step 305. In some embodiments, the transceiver 400 determines that a processing power of the transceiver 400 is above a first threshold. Fore example, the transceiver may decode a control channel to determine which/how many RBs has been granted. As a result of this, MCS is also determined from the control channel. This way, the transceiver 400 has knowledge of how much processing power is needed for the decoding. If it is determined that the transceiver 400 has been granted many resource blocks, i.e. many data blocks covering many resource blocks, the transceiver 400 will know that it will take long time to decode, i.e. "No processing power left". If the transceiver 400 has determined that it has been granted only a few RBs, it will know that there will be processing power left. Furthermore, the transceiver 400 may use SNR information to determine if the processing power is above the first threshold. With a good SNR in combination with a large amount of coding, which is known from MCS information, the transceiver 400 knows that it needs only a few turbo coding iterations for performing the decoding, i.e. there will be processing power left. A low SNR and a high coder rate imply many iterations of the decoding process, which means that there will be no processing power left.

In some embodiments, the time difference between when the last decoding was finished and the time for when the next decoding is expected to be started. This time difference may be utilized to performing decoding steps using the other decoding mode.

Step 306

This step corresponds to steps 270, 280 and 290 in FIG. 2.

The transceiver 400 controls the interference cancelling in the transceiver 400, based on the data block decoded using the first decoding mode and the data block decoded using the second decoding mode.

The following substeps of step 306 are illustrated in detail in FIG. 3*b*.

Step 306*a*

This step corresponds to steps 270, 280 and 290 in FIG. 2, and is a substep of step 306.

In some embodiments, the transceiver 400 obtains a first parameter associated with the data block decoded using the first decoding mode.

Step 306*b*

This step corresponds to steps 270, 280 and 290 in FIG. 2, and is a substep of step 306. Step 306*b* is performed before or after step 306*a*.

In some embodiments, the transceiver 400 obtains a second parameter associated with the data block decoded using the second decoding mode.

Step 306*c*

This step corresponds to steps 270, 280 and 290 in FIG. 2, and is a substep of step 306. Step 306*c* is performed after step 306*a* and 306*b*.

In some embodiments, the transceiver 400 compares the first parameter and the second parameter.

In some embodiments, the first parameter and the second parameter are related to the quality of the decoding of the data block using the first and second parameter, i.e. if the decoding result is of acceptable quality or not. If the quality of the data block decoded using the first decoding mode is not good enough, it may be necessary to change to the second decoding mode. The first parameter and the second parameter may be a cyclic redundancy check, referred to as CRC, block error rate, referred to as BLER, signal to noise and interference ratio, referred to as SINR.

Step 306*d*

This step corresponds to step 280 in FIG. 2. This is a sub step of step 306, and is performed instead of steps 306*a*-306*c* or after steps 306*a*-306*c*. In some embodiments, the transceiver 400 determines that the transceiver 400 remains in the first decoding mode or changes to the second decoding mode.

In some embodiments, the transceiver 400 determines that it should remain in the first decoding mode or changes to the second decoding mode based on the compared first parameter and the second parameter in steps 306*a*-306*c*.

Step 306*e*

This is a sub step of step 306, and is performed instead of step 306*d*, instead of steps 306*a*-306*c* or after step 306*d*. In some embodiments, the transceiver 400 obtains a number of successful decoded data blocks using the second decoding mode.

Step 306*f*

This is a sub step of step 306, and is performed after step 306*e*. In some embodiments, the transceiver 400 determines that the number of successful decoded data blocks using the second decoding mode is above a second threshold.

Step 306*g*

This step corresponds to step 290 in FIG. 2. This is a sub step of step 306, and is performed after steps 306*a*-306*c*, after step 306*d*, after step 306*f* or instead of steps 306*a*-306*c*, 306*d*, 306*e* and 306*f*.

In some embodiments, the transceiver 400 changes to the second decoding mode.

To perform the method steps shown in FIGS. 3*a* and 3*b* for enabling control of interference cancelling in the transceiver 400, the transceiver 400 comprises an arrangement as shown in FIG. 4. The transceiver 400 comprises a storing unit 402 configured to store a received signal comprising a data block. In some embodiments, the storing unit 402 is further configured to store the received signal in a buffer 408.

The transceiver 400 further comprises a decoding unit 403 configured to decode the received signal using the first decoding mode, thereby obtaining the data block. The decoding unit 403 is further configured to decode the retrieved signal using a second decoding mode, thereby obtaining the data block.

The transceiver 400 comprises a retrieving unit 405 configured to, when an event is triggered, retrieve the stored signal. In some embodiments, the event is associated with a block error rate, a number of corrected decoded signals, code rate, transport block size, signal to interference and noise ratio, change of a serving cell or a location of the transceiver 400 in a cell 103.

The transceiver 400 further comprises a controlling unit 406 configured to control the interference cancelling in the transceiver 400, based on the data block decoded using the first decoding mode and the data block decoded using the second decoding mode. In some embodiments, the controlling unit 406 is further configured to determine that the transceiver 400 remains in the first decoding mode or changes to the second decoding mode. In some embodiments, the controlling unit 406 is further configured to determine that a processing power of the transceiver 400 is above a first threshold. In some embodiments, the decoding unit 403 is further configured to decode the retrieved signal using a second decoding mode to obtain the data block when the processing power is above the first threshold. In some embodiments, the controlling unit 406 is further configured to determine that the buffer 408 will be emptied. In some embodiments, the controlling unit 406 is further configured to obtain a number of successfully decoded data blocks using a second decoding mode and to determine that the number of successfully decoded data blocks using a second decoding mode is above a second threshold. In some embodiments, the controlling unit 406 is further configured to change to the second decoding mode. In some embodiments, the controlling unit 406 is configured to obtain a first parameter associated with the data block decoded using the first decoding mode, and to obtain a second parameter associated the data block decoded using the second decoding mode. The controlling unit 406 may be further configured to compare the first parameter and the second parameter. In some embodiments, the controlling unit 406 is configured to determine that the transceiver 400 remains in the first decoding mode or changes to the second decoding mode based on the compared first parameter and the second parameter. In some embodiments, the first parameter and the second parameter are related to the quality of the decoding of the data block using the first and second parameter, i.e. if the decoding result is of acceptable quality or not. If the quality of the data block decoded using the first decoding mode is not good enough, it may be necessary to change to the second decoding mode. The first parameter and the second parameter may be a cyclic redundancy check, referred to as CRC, block error rate, referred to as BLER, signal to noise and interference ratio, referred to as SINR.

The present mechanism for enabling control of interference cancelling in the transceiver 400 may be implemented through one or more processors, such as a processing unit 410 in the arrangement depicted in FIG. 4, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the transceiver 400. One such carrier may be in the form of a CD ROM disc. It is however feasible with other data carriers such as a memory stick. The computer program code may furthermore be provided as pure program code on a server and downloaded to the transceiver 400 remotely.

Summarized, the embodiments herein provide a method and transceiver for detection of when IC should be enabled or disabled. The transceiver stores and decodes the received data blocks with one of an IC decoding or a non-IC decoding approach. Once a certain event occurs, e.g. block error, time instant, transport block size, MCS, SINR per RB, serving cell change, etc., the data block is played back from the memory and decoded using the other decoding mode. The result is evaluated and based on the evaluation the decoding mode is switched.

The embodiments herein are not limited to the above described preferred embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in a transceiver for enabling control of interference cancelling in the transceiver, the transceiver being in a first decoding mode, the method comprising:
    storing a received signal comprising a data block;
    decoding the received signal using the first decoding mode to obtain the data block, wherein the first decoding mode is a non-interference decoding mode;
    when an event is triggered, retrieving the stored signal, the event being associated with at least one of:
        a block error rate,
        a number of corrected decoded signals,
        a code rate,
        a transport block size,
        a signal to interference and noise ratio,
        a change of a serving cell, and
        a location of the transceiver in a cell;
    decoding the retrieved stored signal using a second decoding mode to obtain the data block, wherein the second decoding mode is an interference decoding mode;
    controlling the interference cancelling in the transceiver, based on the data block decoded using the first decoding mode and the data block decoded using the second decoding mode;
    wherein the controlling the interference cancelling in the transceiver comprises determining whether the transceiver remains in the first decoding mode or changes to the second decoding mode.

2. The method of claim 1, wherein the decoding the retrieved signal using the second decoding mode comprises:
    determining that a processing power of the transceiver is above a first threshold;
    wherein the retrieved signal is decoded using the second decoding mode to obtain the data block in response to the processing power being above the first threshold.

3. The method of claim 1:
    wherein the storing the received signal comprises storing the received signal in a buffer;
    further comprising determining that the buffer will be emptied.

4. The method of claim 1, wherein the controlling the interference cancelling in the transceiver comprises:
    obtaining a number of successful decoded data blocks using the second decoding mode;
    determining that the number of successful decoded data blocks using the second decoding mode is above a second threshold.

5. The method of claim 1, wherein the controlling the interference cancelling in the transceiver comprises changing to the second decoding mode.

6. The method of claim 1, wherein the controlling the interference cancelling in the transceiver comprises:
    obtaining a first parameter associated with the data block decoded using the first decoding mode;
    obtaining a second parameter associated with the data block decoded using the second decoding mode;
    wherein the determining that the transceiver remains in the first decoding mode or changes to the second decoding mode is based on comparing first parameter and the second parameter.

7. The method of claim 6, wherein the first parameter and the second parameter are either:
    both a cyclic redundancy check;
    both a block error rate; or
    both a signal to noise and interference ratio.

8. The method of claim 1, wherein the transceiver is comprised in a user equipment or in a base station.

9. A transceiver comprising at least one processor and at least one memory including computer program code, the memory and the computer program code configured to, working with the processor, cause the transceiver to:
    store a received signal comprising a data block;
    decode the received signal using a first decoding mode, to obtain the data block, wherein the first decoding mode is a non-interference cancelling decoding mode;
    a retrieving unit configured to, when an event is triggered, retrieve the stored signal, the being associated with at least one of:
        a block error rate,
        a number of corrected decoded signals,
        a code rate,
        a transport block size,
        a signal to interference and noise ratio,
        a change of a serving cell, and
        a location of the transceiver in a cell;
    decode the retrieved signal using a second decoding mode to obtain the data block;
    control the interference cancelling in the transceiver, based on the data block decoded using the first decoding mode and the data block decoded using the second decoding mode;
    determine that the transceiver remains in the first decoding mode or changes to the second decoding mode.

10. The transceiver of claim 9:
    wherein the controlling unit is further configured to determine that a processing power of the transceiver is above a first threshold;
    wherein the decoding unit is further configured to decode the retrieved signal using the second decoding mode to obtain the data block in response to the processing power being above the first threshold.

11. The transceiver of claim 9:
wherein the memory comprises a buffer configured to store the received signal;
wherein the controlling unit is further configured to determine that the buffer will be emptied.

12. The transceiver of claim 9, wherein the controlling unit is further configured to:
obtain a number of successfully decoded data blocks using a second decoding mode; and
determine that the number of successfully decoded data blocks using a second decoding mode is above a second threshold.

* * * * *